United States Patent
Kang et al.

(10) Patent No.: US 9,226,112 B2
(45) Date of Patent: Dec. 29, 2015

(54) MOTION BASED SERVICE PROVISION

(71) Applicant: KT Corporation, Seongnam (KR)

(72) Inventors: Moon-Soon Kang, Seongnam-si (KR); Jang-hyuk Park, Seoul (KR)

(73) Assignee: KT CORPORATION, Seongnam (KR)

( * ) Notice: Subject to any disclaimer, the term of this patent is extended or adjusted under 35 U.S.C. 154(b) by 188 days.

(21) Appl. No.: 13/886,621

(22) Filed: May 3, 2013

(65) Prior Publication Data
US 2013/0295964 A1 Nov. 7, 2013

(30) Foreign Application Priority Data
May 4, 2012 (KR) .................. 10-2012-0047653

(51) Int. Cl.
H04W 24/00 (2009.01)
H04W 4/04 (2009.01)
H04W 4/02 (2009.01)
G06Q 30/02 (2012.01)

(52) U.S. Cl.
CPC ............ *H04W 4/043* (2013.01); *G06Q 30/02* (2013.01); *H04W 4/02* (2013.01)

(58) Field of Classification Search
CPC .............................. H04W 48/04; H04W 4/02
USPC ............... 455/456.2, 574, 418, 456.1, 456.6, 455/456.3, 41.2, 566, 550.1; 370/328, 241
See application file for complete search history.

(56) References Cited

U.S. PATENT DOCUMENTS

2007/0032247 A1* 2/2007 Shaffer et al. ............. 455/456.1
2010/0317371 A1* 12/2010 Westerinen et al. ....... 455/456.6

* cited by examiner

*Primary Examiner* — Kiet Doan
(74) *Attorney, Agent, or Firm* — Brundidge & Stanger, P.C.

(57) ABSTRACT

In one example embodiment, an end device includes a sensor configured to sense a motion of the end device; a location detector configured to detect a location of the end device; a translator configured to translate parameters of the sensed motion into a service request stored in a memory of the end device; a transmitter configured to transmit, to a service provider, the service request and the location of the end device; and a receiver configured to receive, from the service provider, an expression of a service that is associated with an object located within a predetermined range of the end device.

13 Claims, 13 Drawing Sheets

FIG. 2A
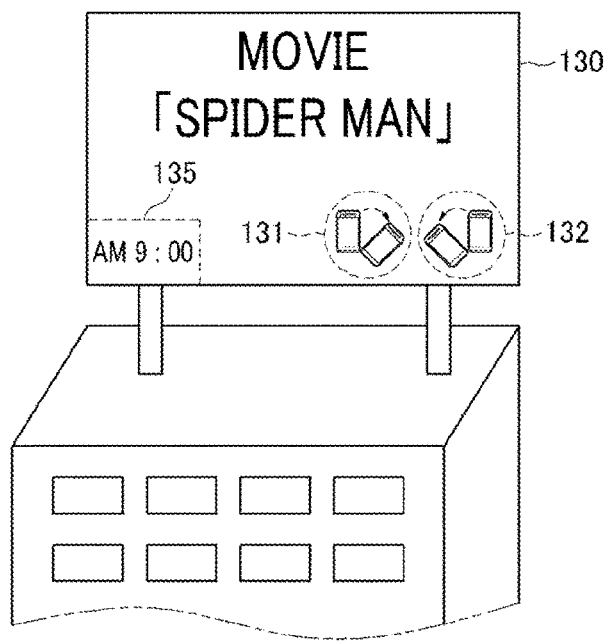
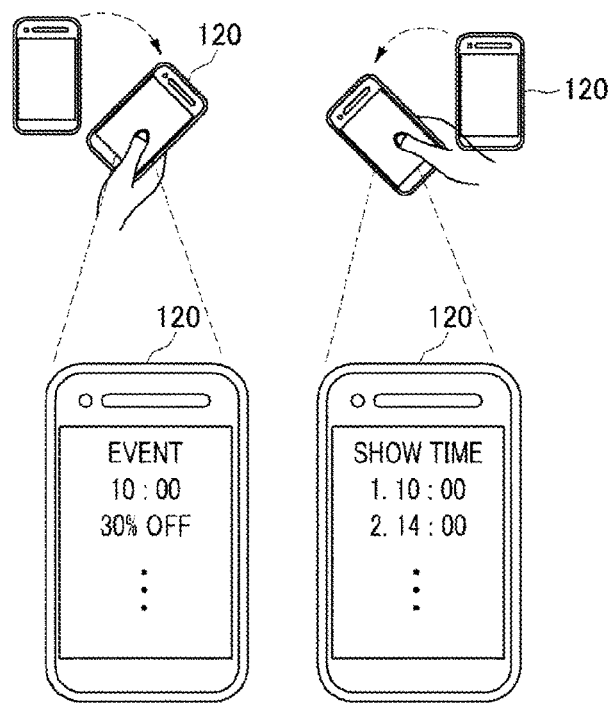

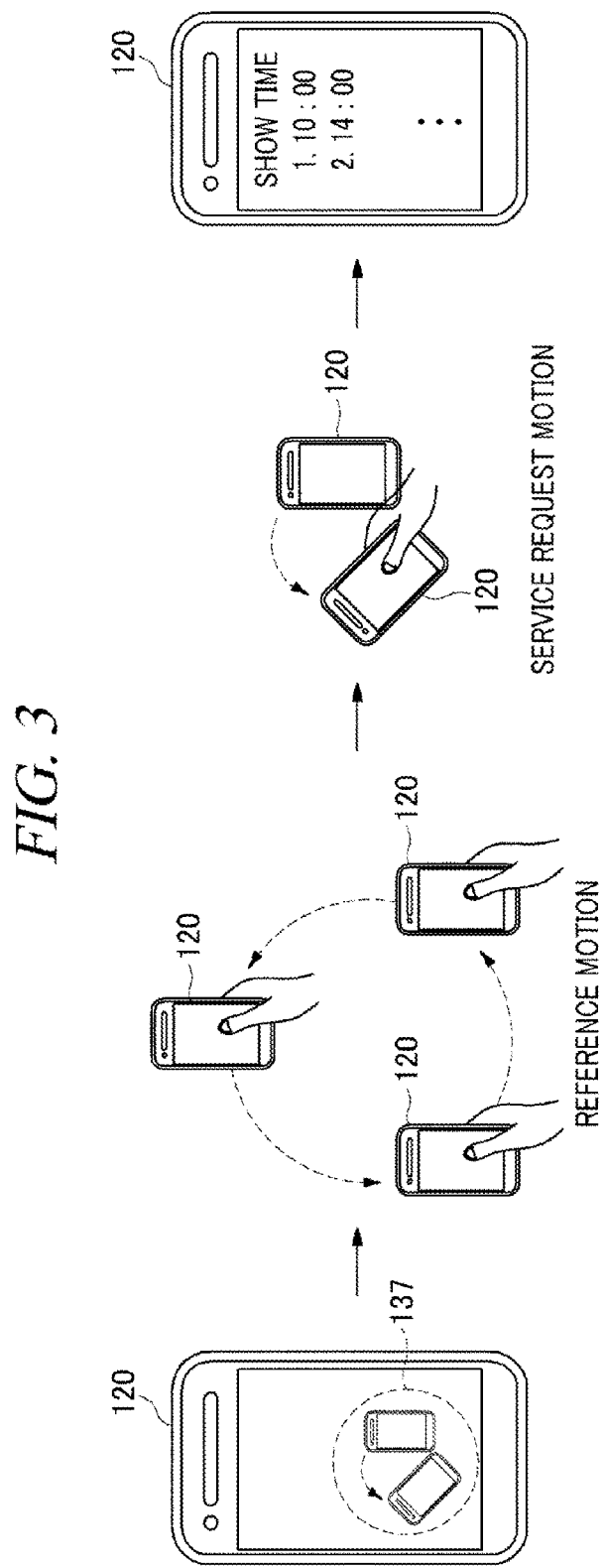

| OBJECT | LOCATION OF OBJECT | SERVICE PROVIDING MOTION | SERVICE PROVIDING TIME | SERVICE |
|---|---|---|---|---|
| OBJECT 1 | LOCATION 1 | MOTION 1 | 09:00 ~ 18:00 | SERVICE 1 |
| | | MOTION 2 | 18:00 ~ 09:00 | SERVICE 2 |
| OBJECT 2 | LOCATION 2 | MOTION 3 | 24:00 ~ 12:00 | SERVICE 3 |
| | | MOTION 4 | 12:00 ~ 24:00 | SERVICE 4 |
| ⋮ | ⋮ | ⋮ | ⋮ | ⋮ |

MOTION BASED SERVICE PROVISION

TECHNICAL FIELD

The embodiments described herein pertain generally to schemes for requesting and providing services based on a motion enacted on an end device.

BACKGROUND

An electronic device may include a motion sensor and/or accelerometer that are configured to detect parameters of a motion enacted on the electronic device. The electronic device may use the detected motion to perform various functions or to execute one or more application programs hosted on the electronic device.

SUMMARY

In one example embodiment, an end device includes a sensor configured to sense a motion of the end device; a location detector configured to detect a location of the end device; a translator configured to translate parameters of the sensed motion into a service request stored in a memory of the end device; a transmitter configured to transmit, to a service provider, the service request and the location of the end device; and a receiver configured to receive, from the service provider, an expression of a service that is associated with an object located within a predetermined range of the end device.

In another example embodiment, a server includes a memory configured to store location information of an object, motion information associated with a service, and service information regarding the service with regard to the object; a receiver configured to receive, from an end device, location information of the end device and motion information regarding a motion that was enacted by a user relative to the end device; a correlation calculator configured to determine that a location correlation between the location information of the object and the location information of the end device is quantifiable to be at least a first predetermined value, and determine that a motion correlation between the motion information and the received motion information is quantifiable to be at least a second predetermined value; and a service transmitter configured to transmit an expression of the service to the end device depending on the location correlation and/or the motion correlation.

In yet another example embodiment, a system includes an end device configured to sense a motion of the end device, translate parameters of the sensed motion into a service request, and transmit, to a service provider, the service request and a location information of the end device; and the service provider configured to: receive, from the end device, the service request and the location information of the end device, and provide the end device with an expression of a service that is associated with an object located within a predetermined range of the end device.

In yet another example embodiment, a computer-readable medium stores instructions that, when executed, cause one or more processor to perform operations that include registering location information of an object, motion information associated with a service, and service information regarding the service with regard to the object; receiving, from the end device, location information of the end device and motion information regarding a motion that was enacted by a user relative to the end device; determining that a location correlation between the location information of the object and the location information of the end device is quantifiable to be at least a first predetermined value; determining that a motion correlation between the teaching motion information and the received motion information is quantifiable to be at least a second predetermined value; and transmitting an expression of the service to the end device depending on at least one of the location correlation or the motion correlation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2A shows an illustrative example of a system in which one or more embodiments of motion based service provision may be implemented;

FIG. 3 shows an example of an end device by which at least portions of one or more embodiments of motion based service provision may be implemented;

DETAILED DESCRIPTION

Figure 1:
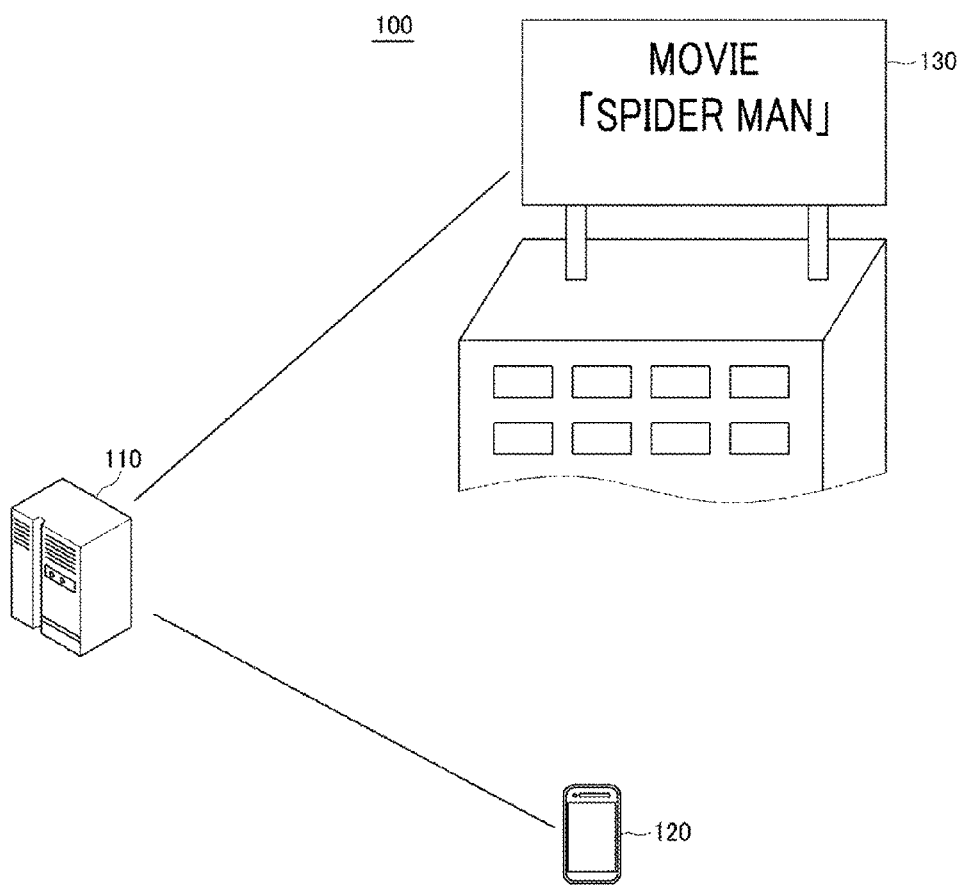
FIG. 1 shows an example system configuration in which one or more embodiments of motion based service provision may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which one or more embodiments of motion based service provision may be implemented. As depicted in FIG. 1, system configuration 100 includes, at least, a service provider 110, an end device 120, and an object 130.

Service provider 110 may refer to an organization, e.g., business, government, or technical entity that provides some type of communications, data storage, data or information processing, content service, or any combination thereof for business customers or consumers. Service provider 100 may host one or more servers or other processing apparatuses that may be configured to receive one or more service requests from end device 120, and to provide end device 120 with one or more expressions of at least one service in response to the received service request. Non-limiting examples of service provider 100 may include an Internet service provider, i.e., ISP; application service provider, i.e., ASP; storage service provider, i.e., SSP; and television service provider, i.e., cable TV, DSL and DBS. Further, non-limiting examples of expressions of at least one service in response to the received request may include information regarding the subject matter that is displayed or advertised on object 130.

End device 120 may refer to a notebook, a personal computer, a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals. As referenced herein, a user (not shown) who owns or otherwise exercises control over an embodiment of end device 120 may move in such a manner to enact one or more detectable motions upon or by end device 120. Thus, some example embodiments of end device 120 may include at least one motion sensor, e.g., gyroscope, accelerometer, motion detecting camera, etc.

Object 130 may refer to an apparatus or a display medium that may display at least, e.g., one or more videos, advertisements, etc. By way of examples, but not limited to, object 130 may include a digital signage, an electronic display or a non-electronic display. In the example illustrated in FIG. 1, it may be assumed that one object 130 is included in configuration 100. However, one skilled in the art will appreciate that any number of objects can be included in configuration 100.

In some example embodiments, object 130 may display an advertisement regarding a movie, e.g., "SPIDER MAN", and end device 120 may be located within a predetermined communication range of object 130 to receive an expression of a service regarding the movie, i.e., the subject matter of which is currently displayed or advertised on object 130. For example, a user holding end device 120 may stand in front of object 130. As set forth above, non-limiting examples of expressions of at least one service in response to the received request may include information regarding the subject matter that is displayed or advertised on object 130. Thus, in accordance with the aforementioned example embodiments, the expression of the service regarding the movie may include a synopsis of the movie, show times for the theaters, ticket availability for particular showings, ticket prices, etc.

End device 120 may be configured to sense a motion of end device 120 by using one or more of well-known motion sensors such as a gyroscope, an accelerometer, and a motion detecting camera that are built-in, connected, or otherwise associated with end device 120. By way of example, but not limited to, the motion of end device 120 may refer to at least one of a posture of end device 120 at a certain time, a number of rotations of end device 120 during a predefined period of time, a pattern of movement enacted by a user on end device 120. Further, end device 120 may detect a location of end device 120 by using any one of well-known location detecting schemes using a global positioning system (GPS), a third generation (3G) and/or fourth generation (4G) mobile telecommunication network system.

As referenced herein, the "posture" of end device 120 may refer to the actual physical disposition of the device, as sensed by one or more of the associated gyroscope, accelerometer, motion detecting camera, etc. The aforementioned disposition may be made with regard to geographic location, e.g., city, street address, latitude and longitude, cardinal direction (east, west, north, or south).

As referenced herein, a "certain time" may refer to a time at which a posture of end device 120, physical disposition of end device 120, or motion enacted upon end device 120 is sensed, detected, and/or recorded.

As referenced herein, a "number of rotations" of end device 120 may refer to a number that may be counted/recorded as the device rotates with regard to a virtual rotation axis.

Further, end device 120 may be configured to translate parameters of the sensed motion into a service request. Such a motion may be referred to as a service request motion, which may be a motion that is enacted by a user relative to, i.e., on or upon, end device 120 with the intention to receive an expression of a service from service provider 110. In some embodiments, a depiction of the service request motion may be displayed for the user's reference on a display of end device 120. Motion information regarding the service request motion may be preliminarily provided from service provider 110 and stored in a memory of end device 120. Therefore, when a motion is sensed by the motion sensor that is built-in, connected to, or otherwise associated with end device 120, and end device 120 determines that the sensed motion corresponds to the service request motion, end device 120 may generate the service request associated with the service request motion or may select the service request stored previously in the memory of end device 120.

End device 120 may transmit the aforementioned generated or selected service request, as well as location information of end device 120, to service provider 110 via a wireless or a wired network. Further, in some embodiments, end device 120 may further transmit information regarding the sensed motion of end device 120, as well as the service request and the location information, to service provider 110. End device 120 may calculate a motion correlation between the sensed motion of end device 120 and the service request motion, and determine whether a calculated quantified value of the motion correlation is at least a predetermined value stored in the memory of end device 120. If the calculated quantified value of the motion correlation is at least the predetermined value, end device 120 may transmit the information regarding the sensed motion of end device 120 to service provider 110 in addition to the service request and the location information.

In some embodiments, end device 120 may further transmit additional information to service provider 110 in addition to the service request and the location information, via a wireless or wired network. Optionally, end device 120 may further transmit the motion information together with the additional information, the service request and the location information to service provider 110. By way of examples, but not limited to, the additional information may include at least one of a time at which end device 120 sensed the motion enacted thereon, weather information in the vicinity of end device 120 when end device 120 sensed the motion enacted thereon, noise information in the vicinity of end device 120 when end device 120 sensed the motion enacted thereon, user information regarding the user of end device 120, and device information regarding end device 120. End device 120 may detect at least one of the time, the weather information and the noise information by using any one of well-known sensors such as a clock, a thermometer, or a hygrometer installed in, connected to, or otherwise associated with end device 120. Alternatively, end device 120 may receive at least one of the time, the weather information and the noise information from an external server/apparatus (not illustrated in FIG. 1). By way of examples, but not limited to, the user information regarding the user of end device 120 may include at least one of an age of the user, a gender of the user, etc. Further, By way of example, but not limited to, the device information regarding end device 120 may include at least one of a unique identifier of end device 120, e.g., telephone number, a media access control (MAC) address of end device 120, an internet protocol (IP) address of end device 120, etc.

In some embodiments, service provider 110 may receive, at least, the service request and the location information of end device 120 from end device 120, via a wired or wireless network. Service provider 110 may select a service from among multiple services stored in a memory of service provider 110 based on the received location information regarding end device 120 and location information of object 130. As set forth above, non-limiting examples of expressions of a service stored in the memory of service provider 110 may include providing information regarding the subject matter that is displayed or advertised on object 130.

In some embodiments, service provider 110 may pre-register and store the location information of at least one object, including object 130, and service information regarding at least one service associated with the at least one object. Service provider 110 may calculate a location correlation between the location information of end device 120 and the location information of object 130. Then, service provider may determine whether a calculated quantified value of the location correlation is at least a predetermined value stored in the memory of service provider 110. If the calculated quantified value of the location correlation is determined to be at least the predetermined value, service provider 110 may select the service that is associated with object 130 and stored in the memory of service provider 110. Then service provider 110 may provide an expression of the selected service to end device 120.

In some embodiments, service provider 110 may further receive the information regarding the sensed motion of end device 120, in addition to the service request and the location information of end device 120, from end device 120, via wired or wireless network. In some embodiments, service provider 110 may pre-register and store motion information regarding at least one service providing motion with regard to respective services. The service providing motion may be identical or analogous to the service request motion, i.e., the service providing motion may refer to a motion that is to be enacted by the user of end device 120 to receive a service from service provider 110. Service provider 110 may calculate a motion correlation between the information regarding the sensed motion of end device 120 and the motion information regarding the at least one service providing motion. Then, service provider 110 may determine whether the calculated quantified value of the motion correlation is at least a predetermined value stored in the memory of service provider 110. If the calculated quantified value of the motion correlation is at least the predetermined value, service provider 110 may select a service that is stored in the memory of service provider 110 in association with object 130 and the service providing motion. Then service provider 110 may provide an expression of the selected service to end device 120.

In some embodiments, service provider 110 may further receive the additional information from end device 120, via a wireless or wired network, in addition to the service request and the location information. In some embodiments, service provider 110 may pre-register and store the multiple services in association with at least one of the aforementioned additional information, e.g., time intervals, weather conditions, noise levels, age groups of users, or genders of users. Then, service provider 110 may select a service from among the multiple services based on the received additional information and provide an expression of the selected service to end device 120.

Thus, FIG. 1 show an example system configuration 100 including end device 120 that may transmit a service request translated from a sensed motion of end device 120 and service provider 110 that may provide an expression of a service associated with object 130 to end device 120.

FIG. 2A shows an illustrative example of a system in which one or more embodiments of motion based service provision may be implemented. In some examples, service provider 110 may transmit, to object 130 via a wireless or wired network, one or more embodiments of service providing motion information 131 and/or 132 that depicts a motion to be enacted by a user relative to end device 120 to receive a service from service provider 110. Object 130 may receive the one or more embodiments of service providing motion information 131 and/or 132 from service provider 110, and display service providing motion information 131 and/or 132 for the benefit of any embodiment of end device 120 who is proximately located near object 130 and who may desire to receive a service, i.e., further information, regarding the subject matter that is displayed and/or advertised on object 130. In addition, or alternatively, object 130 may display a present time 135 (e.g., 9 AM).

By way of example, but not limited to, service providing motion information 131 may depict a motion such as shaking of end device 120 to a right side while service providing motion information 132 may depict a motion such as shaking of end device 120 to a left side. Further to such examples, if a user of end device 120 shakes end device 120 to the right while standing in front of object 130 at 9 AM, end device 120 may sense the shaking motion to the right, and translate parameters of the sensed motion into a certain service request.

In some embodiments, end device 120 may translate the sensed motion into a particular service request motion when the motion is sensed under one or more predefined conditions. Non-limiting examples of such predefined conditions may include end device 120 sensing the motion while a predetermined application is activated on end device 120 or if the motion is sensed while a predetermined web page is open on a web browser on end device 120. Regardless, when end device 120 determines that the sensed motion corresponds to a service request motion, end device 120 may generate the service request associated with the service request motion, or may select the service request from the memory of end device 120.

Further to the aforementioned examples, end device 120 may further transmit, to service provider 110 via a wireless or wired network, the service request and location information of end device 120, which may or may not be transmitted to service provider 110 together with one or more of present time information (e.g., 9 AM), and motion information regarding the sensed motion (e.g., right side shaking motion). Service provider 110 may then select a service from among multiple services that are stored in the memory of service provider 110 based on the received service request and the location information of end device 120. The selection of the service from among the multiple stored services may include one or more of the received motion information of end device 120, and the time at which the motion was sensed by end device 120. Then, service provider 110 may transmit an expression of the selected service to end device 120.

Still further to such examples, but not limited to, service provider 110 may store, in a local memory, a service that provides information regarding the subject matter of that which is displayed and/or advertised on object 130. Thus, an expression of the selected service may include transmitting a price for admission to a movie, e.g., "SPIDER MAN" that is advertised on object 130, in response to a detect service request motion that is identical or analogous to a right side shaking motion. Accordingly, as depicted in FIG. 2A, when the user of end device 120 shakes end device 120 to the right side while standing in the vicinity of object 130 at, e.g., 9 AM, service provider 110 may transmit, to end device 120, the expression listing the price of a ticket for the movie that is advertised on object 130, and then the expression, i.e., price, may be displayed on a display of end device 120.

Further, by way of example, FIG. 2A also shows that the user of end device 120 may shake end device 120 to the left when standing in front of object 130 at, e.g., 9 AM. End device 120 may sense the shaking motion to the left, and translate parameters of the sensed motion into a certain service request. End device 120 may transmit, to service provider 110 via a wireless or wired network, the service request and location information of end device 120, which may or may not be transmitted to service provider 110 together with one or more of the present time information (e.g., 9 AM) and motion information regarding the sensed motion, e.g., shaking to the left. Service provider 110 may then select a service from among multiple services that are stored in the memory of service provider 110 based on the received service request and the location information of end device 120. The selection of the service from among the multiple stored services may include one or more of the received motion information of end device 120 and the time at which the motion was sensed by end device 120. Then, service provider 110 may transmit an expression of the selected service to end device 120. Still further to such examples, but not limited to, service provider 110 may store, in a local memory, a service that provides information regarding the subject matter of that which is displayed and/or advertised on object 130. Thus an expression of the selected service may include transmitting a show time for a movie, e.g., "SPIDER MAN" that is advertised on object 130 in response to a detected service request motion that is identical or analogous to end device 120 detecting a shaking motion to the left. Accordingly, as depicted in FIG. 2A, when the user of end device 120 shakes end device 120 to the left side while standing in the vicinity of object 130 at, e.g., 9 AM, service provider 110 may transmit, to end device 120, the expression listing the show time for the movie that is advertised on object 130 and then the expression, i.e., show time, may be displayed on end device 120.

Thus, FIG. 2A shows an illustrative example of a system in one or more embodiments of motion based service provision may be implemented.

Figure 2B:
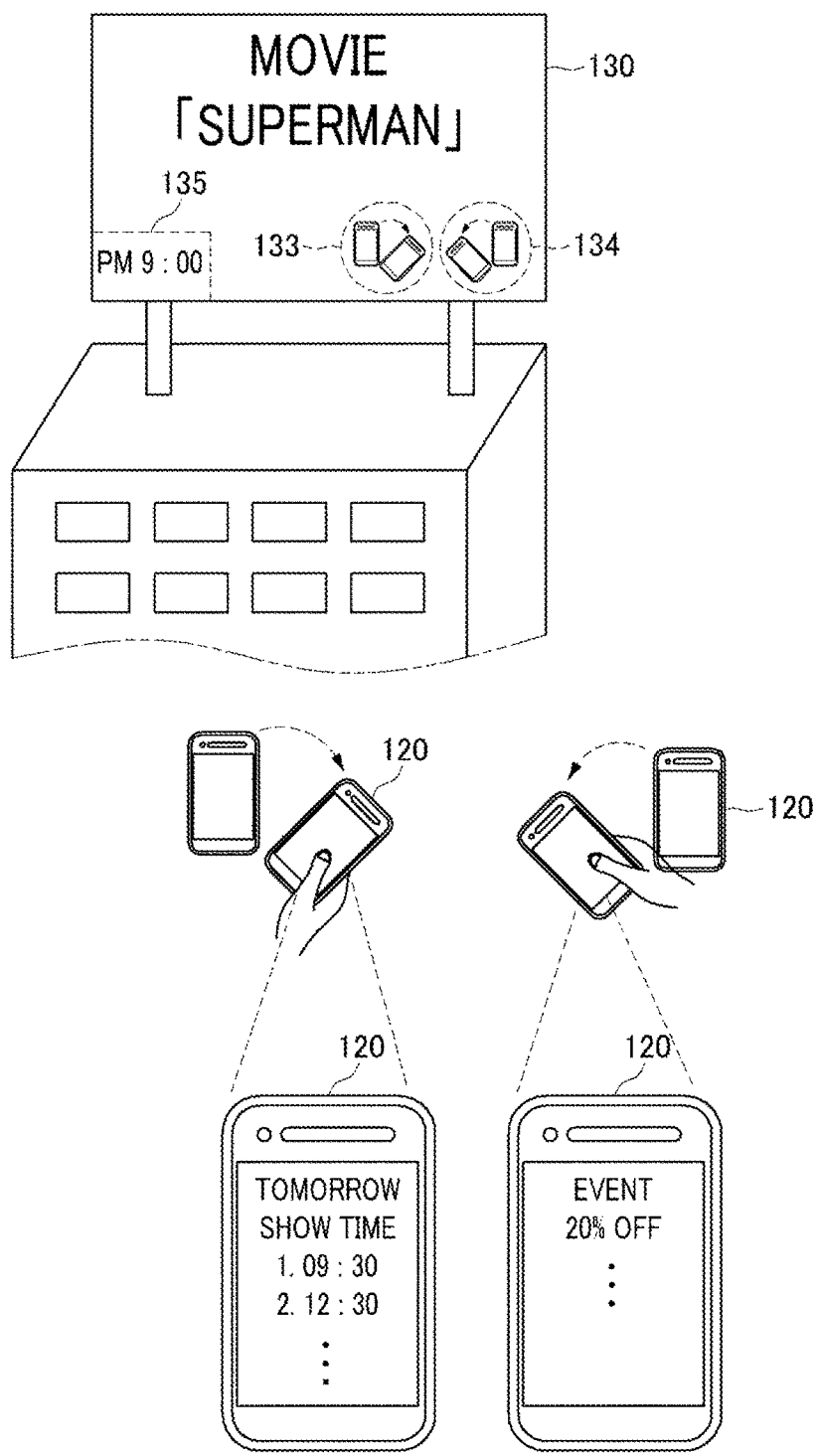
FIG. 2B shows another illustrative example of a system in which one or more embodiments of motion based service provision may be implemented.

FIG. 2B shows another illustrative example of a system in which one or more embodiments of motion based service provision may be implemented. In some examples, service provider 110 may transmit service providing motion information 133 and/or 134 to object 130, via a wireless or wired network. Object 130 may then display service providing motion information 133 and/or 134. Optionally, object 130 may display present time 135, e.g., 9 PM. By way of example, but not limited to, service providing motion information 133 may depict a motion such as shaking of end device 120 to the right while service providing motion information 134 may depict a motion such as shaking of end device 120 to the left.

By way of example, FIG. 2B shows a user, holding end device 120, shaking end device 120 to the right while standing in front of object 130 at 9 PM. End device 120 may sense the shaking motion to the right, and translate parameters of the sensed motion into a certain service request. End device 120 may transmit, to service provider 110, the translated service request and location information of end device 120, which may or may not be transmitted together with one or more of the time at which the motion is sensed, e.g., 9 PM, and motion information regarding the sensed motion, e.g., right side shaking motion.

Service provider 110 may select a service from among multiple services based on the received location information of end device 120 and, if received, the motion information of end device 120 and the time at which the motion was sensed. Then, service provider 110 may transmit an expression of the selected service to end device 120. By way of example, but not limited to, service provider 110 may locally store an expression of the requested service that lists show times for a movie, e.g., "SUPERMAN", that is advertised on object 130. Thus, further to the example, the service that provides show times for movies advertised on object 130 may be associated with a service providing motion that is identical or analogous to end device 120 shaking to the right, when detected in accordance with the received location information of object 130 and a service providing time range, e.g., 9 PM~10 PM.

Further, by way of example, FIG. 2B may also show the user of end device 120 shaking end device 120 to the left, standing in front of object 130 at 9 PM. End device 120 may sense the shaking motion and translate parameters of the sensed motion into a certain service request. End device 120 may transmit, to service provider 110 via a wireless or wired network, the service request and location information of end device 120, which may or may not be accompanied by one or more of the time at which the motion was sensed, e.g., 9 PM, and motion information regarding the sensed motion, e.g., left side shaking motion. Service provider 110 may select a service from among multiple services stored in the memory of service provider 110 based on the received location information of end device 120, and, if received, the motion information of end device 120 and the time at which the motion was sensed. Then, service provider 110 may transmit an expression of the selected service to end device 120.

By way of example, but not limited to, service provider 110 may locally store, in association with the location information of object 130, an expression of the requested service that lists price for admission to watch a movie, e.g., "SUPERMAN", that is advertised on object 130, for which a sensed motion is identical or analogous to end device 120 shaking to the left. Additional considerations thereof may include a service providing time range, e.g., 9 PM~10 PM.

Thus, FIG. 2B shows another illustrative example of a system in one or more embodiments of motion based service provision may be implemented.

Figure 2C:
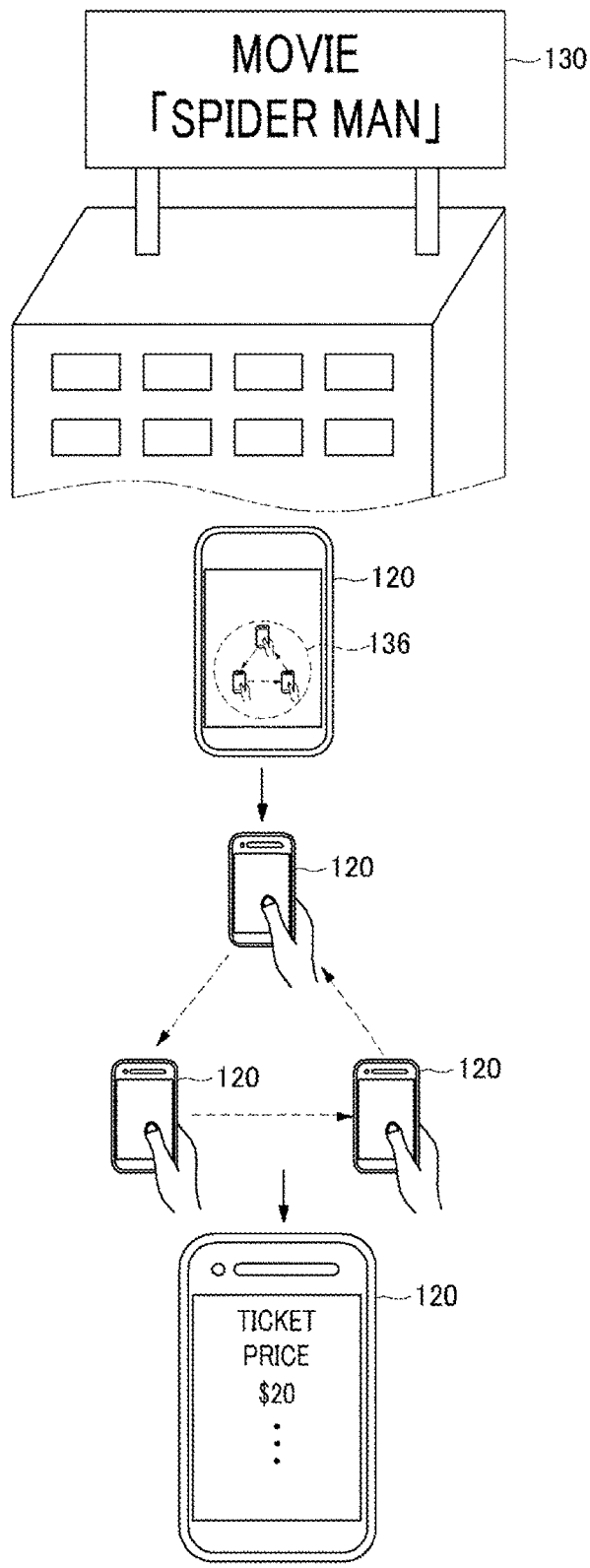
FIG. 2C shows yet another illustrative example of a system in which one or more embodiments of motion based service provision may be implemented.

FIG. 2C shows yet another illustrative example of a system in which one or more embodiments of motion based service provision may be implemented. In some examples, service provider 110 may transmit service request motion information 136 to end device 120, via a wireless or wired network. End device 120 may then display service request motion information 136. By way of example, but not limited to, service request motion information 136 may depict a service request motion such as shaking of end device 120 along a triangle shape.

By way of example, FIG. 2C shows a user, holding end device 120, shaking end device 120 along a triangle shape, while standing in front of object 130. End device 120 may sense the shaking motion and translate parameters of the sensed motion into a certain service request. By way of examples, but not limited to, the parameters of the sensed motion may include at least one of a direction of the sensed motion, a velocity of the sensed motion, or an acceleration of the sensed motion. In some embodiments, end device 120 may calculate a motion correlation between the sensed motion and the service request motion defined by service request motion information 136 by comparing the parameters of the sensed motion and parameters of the service request motion. End device 120 may determine whether a calculated quantified value of the motion correlation is at least a predetermined value stored in the memory of end device 120. If the calculated quantified value of the motion correlation is least the predetermined value, end device 120 may determine that the sensed motion corresponds to the service request motion. Then, end device 120 may generate the service request associated with the service request motion or may select the service request stored previously in the memory of end device 120.

End device 120 may transmit the aforementioned generated or selected service request and location information of end device 120, which may or may not be transmitted together with motion information regarding the sensed motion, e.g., triangle motion, to service provider 110. Service provider 110 may select a service from among multiple services based on the received location information of end device 120 and, if received, the motion information of end device 120. Then, service provider 110 may transmit an expression of the selected service to end device 120. By way of example, but not limited to, service provider 110 may locally store an expression of the requested service that lists a price for a movie, e.g., "SPIDER MAN," that is advertised on object 130. Thus, further to the example, the service that provides price for movies advertised on object 130 may be associated with a service providing motion that is identical or analogous to end device 120 shaking along a triangle motion, when detected in accordance with the received location information of end device 120 which is in the vicinity of object 130.

Thus, FIG. 2C shows yet another illustrative example of a system in which one or more embodiments of motion based service provision may be implemented.

FIG. 3 shows an example of an end device by which at least portions of one or more embodiments of motion based service provision may be implemented. The description of the features depicted of FIG. 3, may be take into consideration configuration 100 of FIG. 1, as well as those of FIGS. 2A, 2B, and 2C. Thus, in FIG. 3, it may be assumed that end device 120 is located in the vicinity of object 130 displaying information such as a movie advertisement. As depicted in FIG. 3, service request motion information 137 depicting a service request motion to be enacted by a user is displayed on end device 120. Service request motion information 137 may be preliminarily provided from service provider 110 (not illustrated in FIG. 3).

In some embodiments, as illustrated in FIG. 3, before the user of end device 120 enacts a motion, e.g., shaking to the left, on end device 120 that corresponds to the service request motion, the user may enact a previous motion, e.g., a circular motion, that corresponds to a predefined reference motion for which a depiction may be stored in the memory of end device 120. End device 120 may sense enactment of the previous motion e.g., a circular motion, and the motion e.g., shaking to the left, subsequent to the previous motion upon end device 120. End device 120 may calculate a motion correlation between the sensed previous motion and the reference motion stored in the memory of end device 120. Then, end device 120 may determine whether the calculated quantified value of the motion correlation is at least a predetermined value stored in the memory of end device 120. When end device 120 determines that the calculated quantified value of the motion correlation is at least the predetermined value, end device 120 may translate parameters of the motion e.g., shaking to the left, subsequent to the previous motion into a service request.

End device 120 may transmit the service request and location information of end device 120, which may or may not be transmitted together with motion information regarding the motion subsequent to the previous motion to service provider 110. Service provider 110 may select a service from among multiple services stored in the memory of service provider 110 based on the received location information of end device 120 and the motion information of end device 120. Then, service provider 110 may transmit an expression of the selected service to end device 120 and the expression may be displayed on end device 120. By way of example, but not limited to, the memory of service provider 110 may locally store an expression of a service that lists show times of a movie that is advertised on object 130. The stored service may be associated with the location information of object 130 and the service request motion that is identical or analogous to the end device 120 shaking to the left.

Thus, FIG. 3 shows an example of an end device by which at least portions of one or more embodiments of motion based service provision may be implemented.

Figures 4, 5:
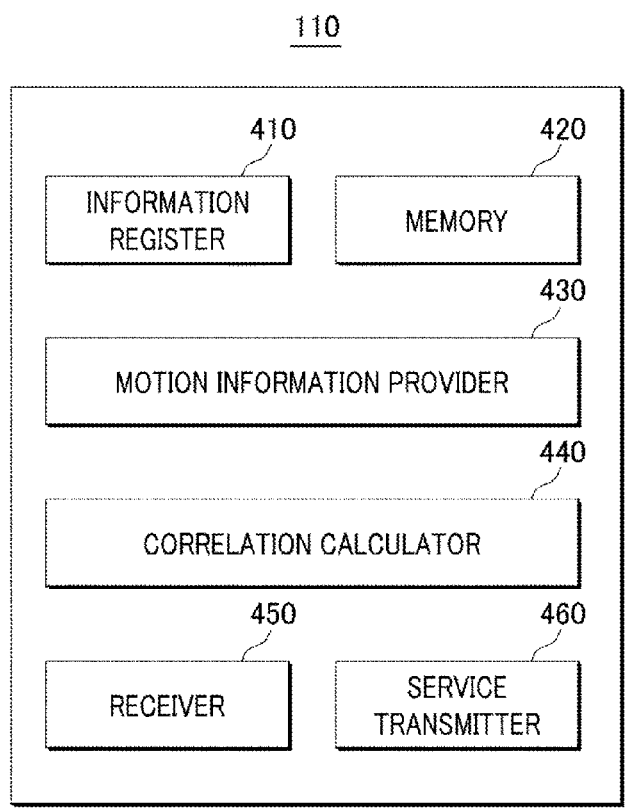
FIG. 4 shows an example configuration of a service provider by which at least portions of motion based service provision may be implemented.
FIG. 5 shows an example data structure of a memory of the service provider of FIG. 4 by which one or more embodiments of motion based service provision may be implemented.

FIG. 4 shows an example configuration of service provider 110 by which at least portions of motion based service provision may be implemented. As depicted in FIG. 4, service provider 110 may include an information register 410, a memory 420, a motion information provider 430, a correlation calculator 440, a receiver 450 and a service transmitter 460. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of information register 410, memory 420, motion information provider 430, correlation calculator 440, receiver 450 and service transmitter 460 may be included in an instance of an application hosted on service provider 110.

Information register 410 may be configured to receive, from an entity that owns or exercises content control over service provider 110 and/or an entity that owns or exercises content control over object 130, location information of at least one object 130, service providing motion information associated with at least one service to be provided to end device 120, service information regarding the at least one service associated with the at least one object 130. Then, information register 410 may be configured to register the location information, the service providing motion information, and the service information in memory 420.

Further, information register 410 may be configured to further receive and register additional information with regard to the service information. By way of example, but not limited to, the additional information may include at least one of time ranges during which a service, or an expression of a service, may be provided to end device 120, weather information, noise information, as well as user information regarding a current user of end device 120.

Memory 420 may be configured to store, at least, the location information of end device 120 when a motion is detected thereby, the service providing motion information regarding a requested service corresponding to a motion detected by end device 120, the service information, and/or the additional information.

Motion information provider 430 may be configured to transmit the service providing motion information regarding at least one embodiment of service providing motion to at least one of end device 120 and object 130. The service providing motion may be a motion that is to be enacted by a user relative to end device 120 to receive from service provider 110.

Correlation calculator 440 may be configured to calculate a quantified value of a location correlation between location information of end device 120 and location information of the at least one object 130. By way of example, but not limited to, correlation calculator 440 may compare GPS coordinates of a location of end device 120 and GPS coordinates of a location of the at least one object 130 and calculate a distance between the location of end device 120 and the location of the at least one object 130. Further, correlation calculator 440 may be configured to determine whether the calculated quantified value of the location correlation is at least a predetermined value. If the calculated quantified value of the location correlation is at least the predetermined value, service provider 110 may determine that a user of end device 120 enacted a motion associated with a service regarding the subject matter of that which is currently displayed or advertised on object 130.

Further, correlation calculator 440 may be configured to calculate a quantified value of motion correlation between motion information of end device 120 and the service providing motion information. By way of example, but not limited to, each of the motion information of end device 120 and the service providing motion information may include parameters such as at least one of a direction, a velocity, an acceleration, etc. In some embodiments, correlation calculator 440 may calculate the quantified value of motion correlation between the sensed motion of end device 120 and a service providing motion defined by the service providing motion information by comparing the parameters of the sensed motion and parameters of the service providing motion. Further, correlation calculator 440 may be configured to determine whether the calculated quantified value of the motion correlation is at least a predetermined value. If the calculated quantified value of the motion correlation is at least the predetermined value, service provider 110 may determine that a user of end device 120 enacted a motion that corresponds to the service providing motion defined by the service providing motion information.

Receiver 450 may be configured to receive, from end device 120, a service request, the location information of end device 120 and the motion information regarding a motion that was enacted by the user relative to end device 120. Further, in some embodiments, receiver 450 may be configured to receive, from end device 120, time information regarding a time at which the user enacted the motion. Further, receiver 450 may be configured to receive additional information including at least one of weather information in the vicinity of end device 120 when the user enacted the motion thereon, noise information in the vicinity of end device 120 when the user enacted the motion thereon, user information, and device information. By way of examples, but not limited to, the user information may include at least one of an age of the user, a gender of the user, etc. Further, the device information may include at least one of a unique identifier of end device 120, a media access control (MAC) address of end device 120, or an Internet protocol (IP) address of end device 120.

Service transmitter 460 may be configured to select a service from the at least one service stored in memory 420 based on the calculated quantified value of the location correlation and/or the calculated quantified value of the motion correlation calculated by correlation calculator 440. Further, in some embodiments, service transmitter 460 may be configured to select a service from the at least one service stored in memory 420 based on the service providing time information stored in memory 420 and the time information transmitted from end device 120 in addition to the location correlation and the motion correlation. Further, in some embodiments, service transmitter 460 may be configured to select a service from the at least one service stored in memory 420 further based on the additional information transmitted from end device 120 in addition to the location correlation and/or the motion correlation. Then, service transmitter 460 may be configured to transmit an expression of the selected service to end device 120.

Thus, FIG. 4 shows an example configuration of a service provider by which at least portions of motion based service provision may be implemented.

FIG. 5 shows an illustrative example of a memory of the service provider of FIG. 4 by which one or more embodiments of motion based service provision may be implemented.

FIG. 5 shows an example data structure of memory 420 of service provider 110 of FIG. 4 by which one or more embodiments of motion based service provision may be implemented. As depicted in FIG. 5, each service, e.g., service 1, service 2, service 3 or service 4, may be stored in memory 420 in association with an object, e.g., object 1 or object 2, a service providing motion, e.g., motion 1, motion 2, motion 3 or motion 4, and a time range, e.g., 9 AM to 6 PM, 6 PM to 9 AM. By way of example, but not limited to, if a user of end device 124 makes a motion that corresponds to the 'motion 1' at 9 AM while standing in the vicinity of the 'location 1' of the 'object 1', service provider 110 may select the 'service 1' from memory 420 and transmit an expression of the 'service 1' to end device 120.

In some embodiments, as depicted in FIG. 5, memory 420 may store an object identifier 510, object location information 520, service providing motion information 530, service providing time information 540, and service information 550.

Figure 6:
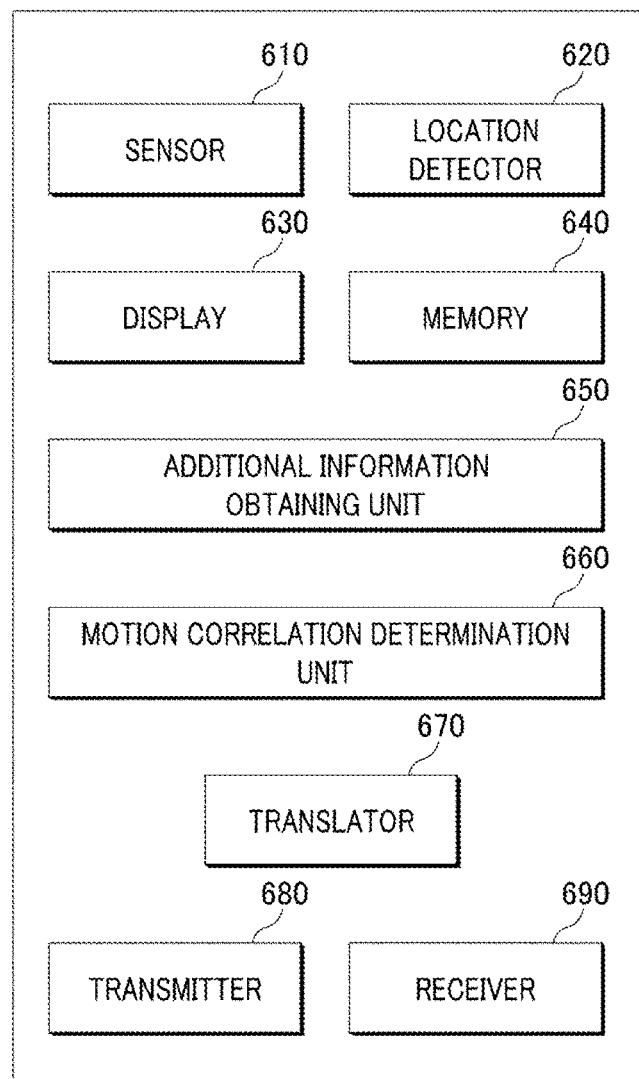
FIG. 6 shows an example configuration of an end device by which at least portions of motion based service provision may be implemented.

FIG. 6 shows an example configuration of end device 120 by which at least portions of motion based service provision may be implemented. As depicted in FIG. 6, end device 120 may include a sensor 610, a location detector 620, a display 630, a memory 640, an additional information obtaining unit 650, a motion correlation determination unit 660, a translator 670, a transmitter 680, and a receiver 690. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of sensor 610, location detector 620, display 630, memory 640, additional information obtaining unit 650, motion correlation determination unit 660, translator 670, transmitter 680, and receiver 690 may be included in an instance of an application hosted on end device 120.

Sensor 610 may be configured to sense a motion that may be enacted upon end device 120 by, e.g., a user thereof. Sensor 610 may sense a motion of end device 120 by using one or more of well-known motion sensors such as a gyroscope, an accelerometer, and a motion detecting camera.

Location detector 620 may be configured to detect a location of end device 120 when a motion enacted upon end device 120 is sensed or detected by sensor 610. Location detector 620 may detect the location of end device 120 by using one or more of well-known location detecting schemes using a global positioning system (GPS), a third generation (3G) and/or fourth generation (4G) mobile telecommunication network system.

Display 630 may be configured to display service request motion information, i.e., service providing motion information, received from service provider 110. The service request motion information may include at least one service request motion that may be enacted by a user relative to end device 120 in order for end device 120 to receive a service from the service provider. Non-limiting examples of such service may include information regarding the subject matter that is displayed or advertised on object 130. Further, display 630 may be configured to display one or more expressions of a service transmitted from the service provider.

Memory 640 may be configured to store at least one service request. By way of example, the user of end device 120 may pre-register the at least one service request in memory 640. Further, memory 640 may be configured to store at least one of the service request motion information or reference motion information regarding a reference motion. In some embodiments, the reference motion may be a motion that is to be enacted by the user upon end device 120 before the user enacts a motion corresponding to the service request motion upon end device 120. That is, the motion that is enacted upon end device prior to the service request may be regarded as a reference motion that indicates a service request motion is impending. End device 120 may translate the motion that is subsequent to the reference motion into the service request.

Further, memory 640 may be configured to store at least one predetermined application that is activated on end device 120 when sensor 610 senses the motion of end device 120. By way of example, but not limited to, the at least one predetermined application may be provided from service provider 110 or one or more of application store. The end device 120 may translate the motion that is sensed by sensor 610 while the at least one predetermined application is activated on end device 120 into the service request.

Additional information obtaining unit 650 may be configured to measure additional information which may include, as non-limiting examples, at least one of a temperature, humidity, or noise level in the vicinity of end device 120 at the time a service request motion is sensed or detected. Thus, additional information obtaining unit 650 may include at least one of a thermometer, a hygrometer, or a noise meter.

Motion correlation determination unit 660 may be configured to calculate a motion correlation between the motion sensed by sensor 610 and the service request motion stored in memory 640. By way of example, but not limited to, each of the motion sensed by sensor 610 and the service request motion may include parameters such as at least one of a direction, a velocity, an acceleration, etc. In some embodiments, motion correlation determination unit 660 may calculate the motion correlation between the motion sensed by sensor 610 and the service request motion by comparing the parameters of the motion sensed by sensor 610 and the parameters of the service request motion. Further, motion correlation determination unit 660 may be configured to determine whether a quantified value of the calculated motion correlation between the sensed motion and the service request motion is at least a predetermined value stored in memory 640. If the quantified value of the calculated motion correlation between the sensed motion and the service request motion is at least the predetermined value, end device 120 may determine to transmit motion information regarding the motion sensed by sensor 610 to service provider 110.

Further, motion correlation determination unit 660 may be configured to calculate a motion correlation between the motion sensed by sensor 610 and the reference motion stored in memory 640. By way of example, but not limited to, each of the motion sensed by sensor 610 and the reference motion may include parameters such as at least one of a direction, a velocity, an acceleration, etc. In some embodiments, motion correlation determination unit 660 may calculate the motion correlation between the motion sensed by sensor 610 and the reference motion by comparing the parameters of the motion sensed by sensor 610 and the parameters of the reference motion. Further, motion correlation determination unit 660 may be configured to determine whether a quantified value of the calculated motion correlation between the sensed motion and the reference motion is at least a predetermined value stored in memory 640. If the quantified value of the calculated motion correlation between the sensed motion and the reference motion is at least the predetermined value, end device 120 may determine to translate a motion that is subsequent to the motion sensed by sensor 610 into a service request.

Translator 670 may be configured to translate parameters of the motion sensed by sensor 610 into a service request stored in memory 640. In some embodiments, translator 670 may translate the parameters of the sensed motion into the service request when the motion is sensed under at least one predefined condition, e.g., a predetermined application is activated on end device 120, or a predetermined web page is open on a web browser of end device 120. Then, if translator 670 determines that the sensed motion corresponds to the service request motion, translator 670 may generate the service request associated with the service request motion or may select the service request from memory 640.

In some embodiments, translator 670 may be configured to translate the parameters of the motion sensed by sensor 610 into the service request when a quantifiable value of motion correlation between a previously sensed motion and the reference motion is at least a predetermined value stored in memory 640.

In some embodiments, translator 670 may determine that the sensed motion corresponds to the service request motion, if a calculated quantified value of the motion correlation, calculated by motion correlation determination unit 660, between the sensed motion and the service request motion is at least a predetermined value that may be stored in memory 640. Then, if translator 670 determines that the sensed motion corresponds to the service request motion, translator 670 may generate the service request associated with the service request or may select the service request from memory 640.

Transmitter 680 may be configured to transmit the service request, location information regarding the location detected by location detector 620, motion information regarding the motion sensed by sensor 610 to service provider 110. Further, in some embodiments, transmitter 680 may be configured to transmit time information regarding a time at which sensor 610 sensed the motion and additional information to the service provider. By way of example, but not limited to, the additional information may include at least one of weather information in the vicinity of end device 120 at the time at which sensor 610 sensed the motion, or noise information in the vicinity of end device 120 at the time at which sensor 610 sensed the motion, user information, and device information. By way of examples, but not limited to, the user information may include at least one of an age of the user, a gender of the user, etc. Further, the device information may include at least one of a unique identifier of end device 120, a media access control (MAC) address of end device 120, or an internet protocol (IP) address of end device 120. Thus, end device 120 may receive various services from service provider 110 according to various conditions including the weather condition, the age of the user, the gender of the user, the kind of end device 120, etc.

Receiver 690 may be configured to receive an expression of a service from service provider 110. Further, receiver 690 may be configured to receive the service request motion information from service provider 110. Further, in some example embodiments, receiver 690 may be configured to receive the additional information including the weather information and the noise information from an external server/apparatus.

Thus, FIG. 6 shows an example configuration of an end device by which at least portions of motion based service provision may be implemented.

Figure 7:
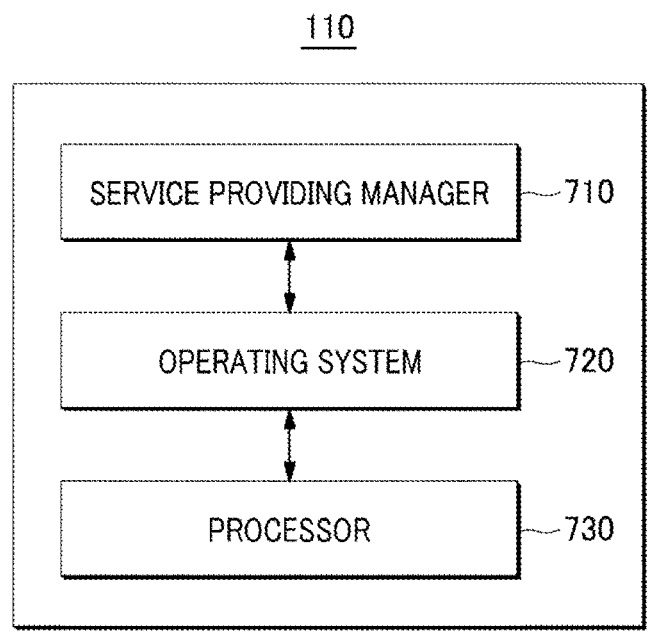
FIG. 7 shows another example configuration of a service provider by which at least portions of motion based service provision may be implemented.

FIG. 7 shows another example configuration of service provider 110 by which at least portions of motion based service provision may be implemented. As depicted, service provider 110 may include service providing manager 710, an operating system 720 and a processor 730. Service providing manager 710 may be an application adapted to operate on operating system 720 such that the motion based service providing schemes as described herein may be provided. Operating system 720 may allow service providing manager 710 to manipulate processor 730 to implement the motion based service providing schemes as described herein.

Figure 8:
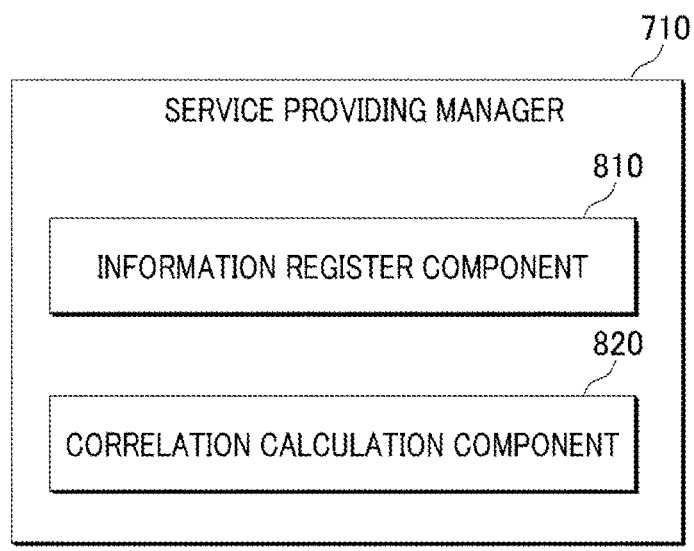
FIG. 8 shows an example configuration of a service providing manager by which at least portions of motion based service provision may be implemented.

FIG. 8 shows an example configuration of a service providing manager 710 by which at least portions of motion based service provision may be implemented. As depicted, service providing manager 710 may include an information register component 810 and a correlation calculation component 820.

Information register component 810 may be configured to register location information of at least object 130, service providing motion information associated with at least one service, service information regarding the at least one service associated with at least one object 130. Information register component 810 may be further configured to register additional information with regard to the service information. By way of example, but not limited to, the additional information may include at least one time range during which a service may be provided to end device 120, weather information at the time a motion is sensed, noise information at the time a motion is sensed, and user information.

Correlation calculation component 820 may be configured to calculate a location correlation between location information of end device 120 and the location information of at least one object 130. By way of example, but not limited to, correlation calculation component 820 may compare GPS coordinates of a location of end device 120 and GPS coordinates of a location of the at least one object 130 and calculate a distance between the location of end device 120 and the location of the at least one object 130. Correlation calculation component 820 may be further configured to determine whether a quantified value of the calculated location correlation is at least a predetermined value. If the calculated quantified value of the location correlation is at least the predetermined value, service provider 110 may determine that a user of end device 120 enacted a motion associated with a service regarding the subject matter of that which is displayed and/or advertised on object 130.

Correlation calculation component 820 may be further configured to calculate a motion correlation between motion information of end device 120 and the service providing motion information. By way of example, but not limited to, each of the motion information of end device 120 and the service providing motion information may include parameters such as at least one of a direction, a velocity, an acceleration, etc. In some embodiments, correlation calculation component 820 may calculate the motion correlation between the sensed motion of end device 120 and a service providing motion defined by the service providing motion information by comparing the parameters of the sensed motion and parameters of the service providing motion. Correlation calculation component 820 may be further configured to determine whether a quantified value of the calculated motion correlation is at least a predetermined value. If the calculated quantified value of the motion correlation is at least the predetermined value, service provider 110 may determine that a user of end device 120 enacted a motion that corresponds to the service providing motion defined by the service providing motion information.

Figure 9:
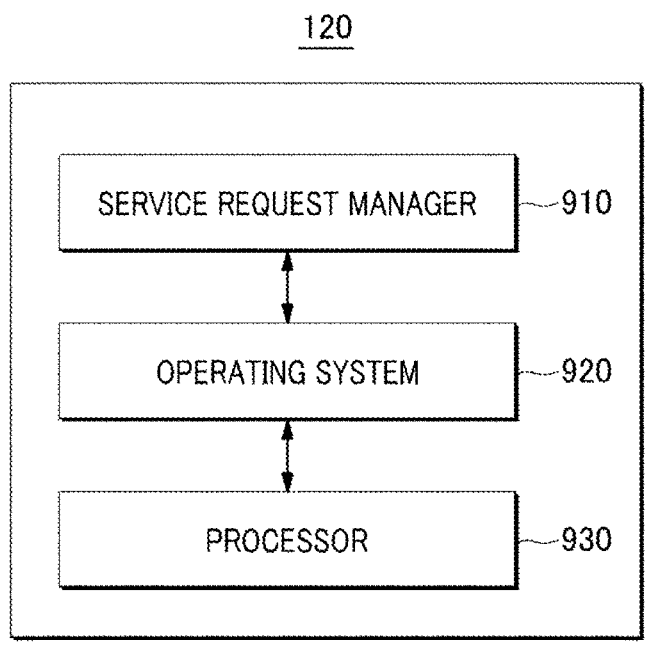
FIG. 9 shows another example configuration of an end device by which at least portions of motion based service request may be implemented.

FIG. 9 shows another example configuration of an end device 120 by which at least portions of motion based service request may be implemented. As depicted, end device 120 may include service request manager 910, an operating system 920 and a processor 930. Service request manager 910 may be an application adapted to operate on operating system 920 such that the motion based service request schemes as described herein may be provided. Operating system 920 may allow service request manager 910 to manipulate processor 930 to implement the motion based service request schemes as described herein.

Figure 10:
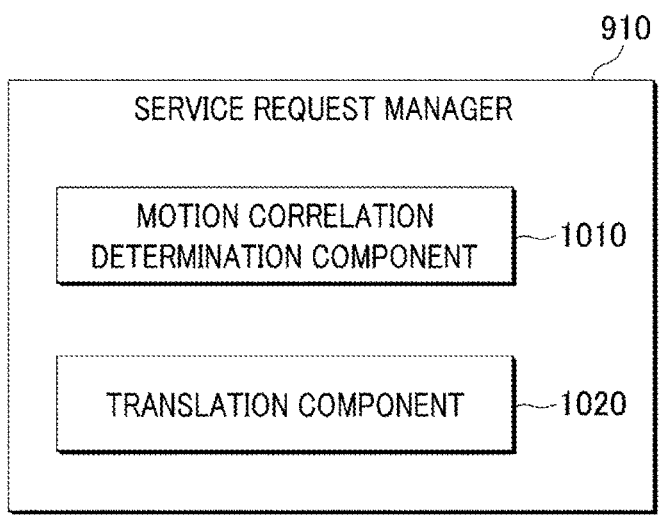
FIG. 10 shows an example configuration of a service request manager by which at least portions of motion based service request may be implemented.

FIG. 10 shows an example configuration of service request manager 910 by which at least portions of motion based service request may be implemented. As depicted, service request manager 910 may include a motion correlation determination component 1010, and a translation component 1020.

Motion correlation determination component 1010 may be configured to calculate a motion correlation between a motion of end device 120 and a service request motion stored in a memory of end device 120. By way of example, but not limited to, each of the motion of end device 120 and the service request motion may include parameters such as at least one of a direction, a velocity, an acceleration, etc. In some embodiments, motion correlation determination component 1010 may calculate the motion correlation between the motion of end device 120 and the service request motion by comparing the parameters of the motion of end device 120 and the parameters of the service request motion. Motion correlation determination component 1010 may be further configured to determine whether a quantified value of the calculated motion correlation between the motion of end device 120 and the service request motion is at least a predetermined value stored in the memory of end device 120. If the quantified value of the calculated motion correlation between the motion of end device 120 and the service request motion is at least the predetermined value, end device 120 may determine to transmit motion information regarding the motion of end device 120 to service provider 110.

Motion correlation determination component 1010 may be further configured to calculate a motion correlation between the motion of end device 120 and a reference motion stored in the memory of end device 120. By way of example, but not limited to, each of the motion of end device 120 and the reference motion may include parameters such as at least one of a direction, a velocity, an acceleration, etc. In some embodiments, motion correlation determination component 1010 may calculate the motion correlation between the motion of end device 120 and the reference motion by comparing the parameters of the motion of end device 120 and the parameters of the reference motion. Motion correlation determination component 1010 may be further configured to determine whether a quantified value of the calculated motion correlation between the motion of end device 120 and the reference motion is at least a predetermined value stored in the memory of end device 120. If the quantified value of the calculated motion correlation between the motion of end device 120 and the reference motion is at least the predetermined value, end device 120 may determine to translate a motion that is subsequent to the motion sensed by sensor 610 into a service request.

Translation component 1020 may be configured to translate parameters of the motion of end device 120 into a service request stored in the memory of end device 120.

Figure 11:
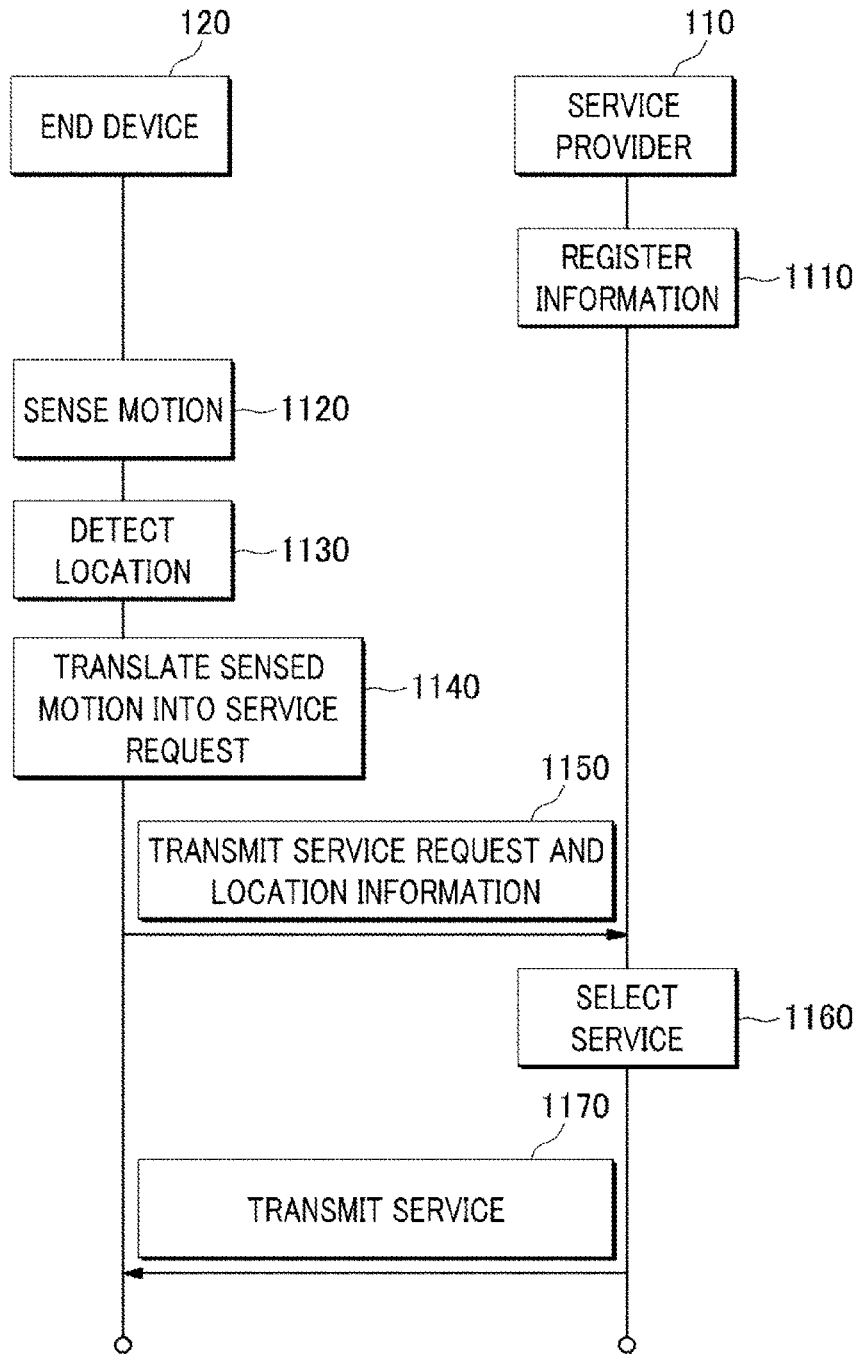
FIG. 11 shows an example processing flow of operations for implementing at least portions of motion based service provision.

FIG. 11 shows an example processing flow 1100 of operations for implementing at least portions of motion based service provision. The operations in FIG. 11 may be implemented in system configuration 100 including service provider 110, end device 120 and object 130, as illustrated in FIG. 1. An example process may include one or more operations, actions, or functions as illustrated by one or more blocks 1110, 1120, 1130, 1140, 1150, 1160 and/or 1170. Although illustrated as discrete blocks, various blocks may be divided into additional blocks, combined into fewer blocks, or eliminated, depending on the desired implementation. Processing may begin at block 1110.

At block 1110 (Register Information), service provider 110 may register, i.e., receive or store, one or more location information of object 130, service providing motion information associated with at least one service, service information regarding the at least one service associated with object 130, additional information that is associated with the at least one service and includes at least one of service providing time information including at least one of plural time intervals, weather information, noise information, or user information. Processing may proceed from block 1110 to block 1120.

At block 1120 (Sense Motion), end device 120 may sense a motion of end device 120 by using any one of well-known motion sensing sensors such as a gyroscope, an accelerometer, and a motion detecting camera. Processing may proceed from block 1120 to block 1130.

At block 1130 (Detect location), end device 120 may detect location of end device 120 by using any one of well-known location detecting schemes using a global positioning system (GPS), a third generation (3G) and/or fourth generation (4G) mobile telecommunication network system. Processing may proceed from block 1130 to block 1140.

At block 1140 (Translate Sensed Motion into Service Request), end device 120 may translate parameters of the motion sensed at block 1120 into a service request. End device 120 may generate a service request or select a service request from a memory of end device 120 according to the motion sensed at block 1120. In some example embodiments, end device 120 may translate the parameters of the sensed motion into the service request, if the motion is sensed at block 1120 while a predetermined application is activated on end device 120. By way of example, but not limited to, the predetermined application may be provided from service provider 110. In some example embodiments, end device 120 may translate the parameters of the sensed motion into the service request, if the motion is sensed at block 1120 while a predetermined web page is open on a web browser of end device 120. By way of example, but not limited to, the predetermined web page may be provided from service provider 110.

In some example embodiments, at block 1140, end device 120 may translate the parameters of the sensed motion into the service request, if a quantified value of a motion correlation between a previous motion prior to the sensed motion and a reference motion stored in a memory of end device 120 is at least a predetermined value stored in the memory of end device 120. By way of example, but not limited to, each of the previous motion and the reference motion may include parameters such as at least one of a direction, a velocity, an acceleration, etc. In some embodiments, end device 120 may calculate the motion correlation between the previous motion and the reference motion by comparing the parameters of the previous motion and the parameters of the reference motion.

In some example embodiments, at block 1140, end device 120 may translate the parameters of the sensed motion into the service request, if a calculated value of a motion correlation between the motion sensed at block 1120 and a service request motion stored in the memory of end device 120 is at least a predetermined value stored in the memory of end device 120. Processing may proceed from block 1140 to block 1150. By way of example, but not limited to, each of the motion sensed at block 1120 and the service request motion may include parameters such as at least one of a direction, a velocity, an acceleration, etc. In some embodiments, end device 120 may calculate the motion correlation between the motion sensed at block 1120 and the service request motion by comparing the parameters of the motion sensed at block 1120 and the parameters of the service request motion. Processing may proceed from block 1140 to block 1150.

At block 1150 (Transmit Service Request and Location Information), end device 120 may transmit, to service provider 110, the service request translated at block 1140 and location information regarding the location of end device 110, which is detected at block 1130. Further, in some embodiments, at block 1150, in addition to service request and the location information, end device 120 may transmit, to service provider 110, motion information regarding the motion sensed at block 1120 and additional information including at least one of a time at which end device 120 sensed the motion of end device 120, weather information in the vicinity of end device 120 at the time at which end device 120 sensed the motion enacted thereon, noise information in the vicinity of end device 120 at the time at which end device 120 sensed the motion enacted thereon, information regarding a user of end device 120, or information regarding end device 120. Processing may proceed from block 1150 to block 1160.

At block 1160 (Select Service), service provider 110 may select a service from the at least one service registered at block 1110. At block 1160, service provider 110 may select the service based on the location information of object 130, which is registered at block 1110, the service providing motion information registered at block 1110, the location information of end device 120 transmitted at block 1150, and the motion information of end device 120, which is transmitted at block 1150. Processing may proceed from block 1160 to block 1170.

At block 1170 (Transmit Service), service provider 110 may transmit an expression of the service selected at block 1160 to end device 120. At block 1170, end device 120 may receive the expression of the service and display the received expression of the service.

Thus, FIG. 11 shows an example processing flow 1100 of operations for implementing at least portions of motion based service provision.

Figure 12:
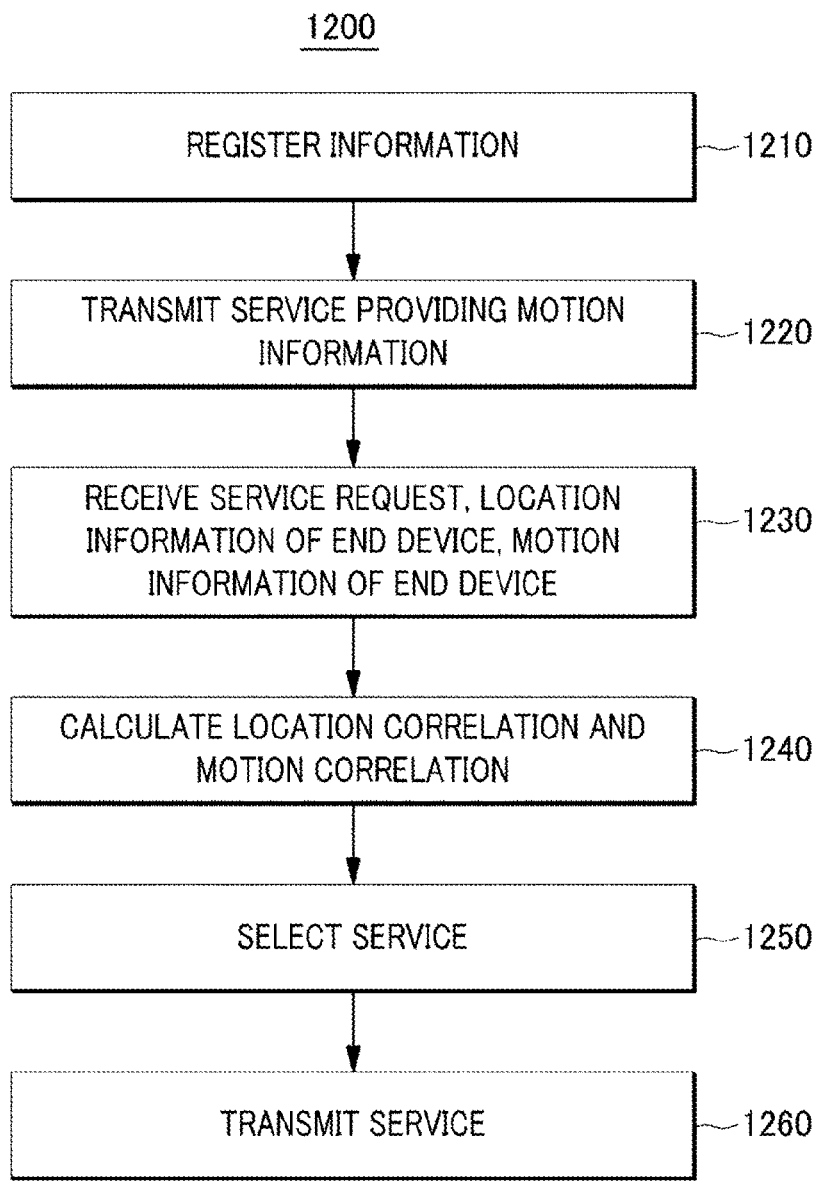
FIG. 12 shows an example processing flow for implementing at least portions of motion based service provision by a service provider.

FIG. 12 shows an example processing flow 1200 for implementing at least portions of motion based service provision by a service provider 100. The process in FIG. 12 may be implemented in system configuration 100 including service provider 110, end device 120 and object 130, as illustrated in FIG. 1. An example process may include one or more operations, actions, or functions as illustrated by one or more blocks 1210, 1220, 1230, 1240, 1250 and/or 1260. Although illustrated as discrete blocks, various blocks may be divided into additional blocks, combined into fewer blocks, or eliminated, depending on the desired implementation. Processing may begin at block 1210.

At block 1210 (Register Information), service provider 110 may register location information of object 130, service providing motion information associated with at least one service, service information regarding the at least one service associated with object 130, and additional information that is associated with the at least one service and includes at least one of service providing time information including at least one of plural time ranges in which a service may be provided to end device 120, weather information at the time a motion is sensed, noise information at the time a motion is sensed, or user information. Processing may proceed from block 1210 to block 1220.

At block 1220 (Transmit Service Providing Motion Information), service provider 110 may transmit the service providing motion information associated with at least one service to at least one of end device 120 and object 130. Processing may proceed from block 1220 to block 1230.

At block 1230 (Receive Service Request, Location Information of End device and Motion Information of End device), service provider 110 may receive, from end device 120, a service request, location information regarding a location of end device 120 and motion information regarding a motion that was enacted by a user relative to end device 120. In some embodiments, at block 1230, service provider 110 may also receive time information regarding a time at which the user of end device 120 enacted the motion from end device 120 in addition to the location information and the motion information. Processing may proceed from block 1230 to block 1240.

At block 1240 (Calculate Location Correlation and Motion Correlation), service provider 110 may calculate a location correlation between the location information of end device 120 received at block 1230 and the location information of object 130, which is registered at block 1210. By way of example, but not limited to, service provider 110 may compare GPS coordinates of a location of end device 120 and GPS coordinates of a location of object 130 and calculate a distance between the location of end device 120 and the location of object 130. Further, at block 1240, service provider 110 may determine whether a quantified value of the calculated location correlation is at least a predetermined value stored in a memory of end device 120. If the quantified value of the calculated location correlation is at least the predetermined value, service provider 110 may determine that a user of end device 120 enacted a motion associated with a service regarding the subject matter of that which is displayed and/or advertised on object 130.

Further, at block 1240, service provider 110 may calculate a motion correlation between the motion information of end device 120, which is received at block 1230 and the service providing motion information registered at block 1210. By way of example, but not limited to, each of the motion information of end device 120 and the service providing motion information may include parameters such as at least one of a direction, a velocity, an acceleration, etc. In some embodiments, service provider 110 may calculate the motion correlation between the motion of end device 120 and a service providing motion defined by the service providing motion information by comparing the parameters of the motion of end device 120 and parameters of the service providing motion. Further, at block 1240, service provider 110 may determine whether a quantified value of the calculated motion correlation is at least a predetermined value stored in a memory of end device 120. If the quantified value of the calculated motion correlation is at least the predetermined value, service provider 110 may determine that a user of end device 120 enacted a motion that corresponds to the service providing motion defined by the service providing motion information. Processing may proceed from block 1240 to block 1250.

At block 1250 (Select Service), service provider 110 may select a service from the at least one service registered at block 1210 if the quantified value of the calculated location correlation is at least the predetermined value and the quantified value of the calculated motion correlation is at least the predetermined value. In some embodiments, service provider 110 may select a service based on the time information of end device 120, which is received at block 1230 and the service providing time information registered at block 1210 in addition to the location correlation and the motion correlation. Processing may proceed from block 1250 to block 1260.

At block 1260 (Transmit Service), service provider 110 may transmit an expression of the service selected at block 1250 to end device 120.

Thus, FIG. 12 shows an example processing flow 1200 for implementing at least portions of motion based service provision by service provider 110.

Figure 13:
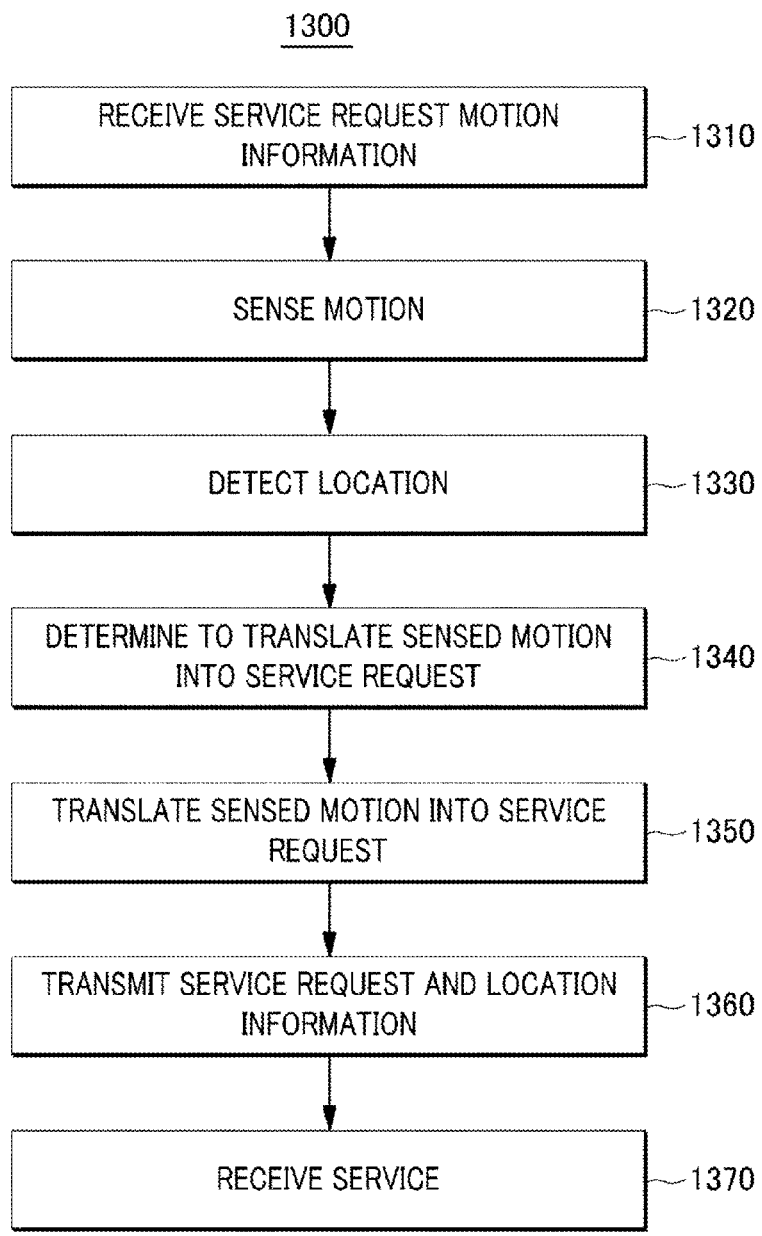
FIG. 13 shows an example processing flow for implementing at least portions of motion based service provision by an end device.

FIG. 13 shows an example processing flow 1300 for implementing at least portions of motion based service provision by an end device 120. The process in FIG. 13 may be implemented in system configuration 100 including service provider 110, end device 120 and object 130, as illustrated in FIG. 1. An example process may include one or more operations, actions, or functions as illustrated by one or more blocks 1310, 1320, 1330, 1340, 1350, 1360 and/or 1370. Although illustrated as discrete blocks, various blocks may be divided into additional blocks, combined into fewer blocks, or eliminated, depending on the desired implementation. Processing may begin at block 1310.

At block 1310 (Receive Service Request Motion Information), end device 120 may receive service request motion information (that is identical or analogous to the service providing motion information of FIG. 12) from service provider 110. The service request motion information may include at least one service request motion that is to be enacted by a user relative to end device 120 to receive a service from service provider 110. Further, at block 1310, end device may display the received service request motion information. Processing may proceed from block 1310 to block 1320.

At block 1320 (Sense Motion), end device 120 may sense a motion of end device 120 by using any one of well-known motion sensing sensors such as a gyroscope, an accelerometer, and a motion sensing camera. Processing may proceed from block 1320 to block 1330.

At block 1330 (Detect location), end device 120 may detect a location of end device 120, which is in a predetermined range of object 130 by using any one of well-known location detecting schemes using a global positioning system (GPS), a third generation (3G) and/or fourth generation (4G) mobile telecommunication network system. Processing may proceed from block 1330 to block 1340.

At block 1340 (Determine to Translate Sensed Motion into Service Request), end device 120 may determine to translate parameters of the motion sensed at block 1320 into a service request. In some embodiments, end device 120 may determine that the motion sensed at block 1320 corresponds to the service request motion if, at block 1320, end device 120 sensed the motion while a predetermined application is activated on end device 120. By way of example, but not limited to, the predetermined application may be provided from service provider 110. Then, if end device 120 determines that the motion sensed at block 1320 corresponds to the service request motion, end device 120 may determine to translate the parameters of the motion sensed at block 1320 into the service request.

In some embodiments, at block 1340, end device 120 may determine that the motion sensed at block 1320 corresponds to the service request motion if, at block 1320, end device 120 sensed the motion while a predetermined web page is open on a web browser of end device 120. By way of example, but not limited to, the predetermined web page may be provided from service provider 110. Then, if end device 120 determines that the motion sensed at block 1320 corresponds to the service request motion, end device 120 may determine to translate the parameters of the motion sensed at block 1320 into the service request.

In some embodiments, at block 1340, end device 120 may determine that the motion sensed at block 1320 corresponds to the service request motion, if a quantified value of a motion correlation between a previous motion prior to the motion sensed at block 1320 and a reference motion is at least a predetermined value stored in a memory of end device 120. By way of example, but not limited to, each of the previous motion and the reference motion may include parameters such as at least one of a direction, a velocity, an acceleration, etc. In some embodiments, end device 120 may calculate the quantified value of the motion correlation between the previous motion and the reference motion by comparing the parameters of the previous motion and the parameters of the reference motion. Then, if end device 120 determines that the motion sensed at block 1320 corresponds to the service request motion, end device 120 may determine to translate the parameters of the motion sensed at block 1320 into the service request.

In some embodiments, at block 1340, end device 120 may determine that the motion sensed at block 1320 corresponds to the service request motion, if a quantified value of a motion correlation between the motion sensed at block 1320 and the service request motion is at least a predetermined value stored in the memory of end device 120. By way of example, but not limited to, each of the motion sensed at block 1320 and the service request motion may include parameters such as at least one of a direction, a velocity, an acceleration, etc. In some embodiments, end device 120 may calculate the quantified value of the motion correlation between the motion sensed at block 1320 and the service request motion by comparing the parameters of the motion sensed at block 1320 and the parameters of the service request motion. Then, if end device 120 determines that the motion sensed at block 1320 corresponds to the service request motion, end device 120 may determine to translate the parameters of the motion sensed at block 1320 into the service request. Processing may proceed from block 1340 to block 1350.

At block 1350 (Translate Sensed Motion into Service Request), end device 120 may translate the parameters of sensed motion into the service request, if, at block 1340, end device 120 determines to translate the parameters of the sensed motion into the service request. In some embodiments, end device 120 may select the service request from at least one predefined service request stored in the memory of end device 120. Further, in some embodiments, end device 120 may generate the service request. Processing may proceed from block 1350 to block 1360.

At block 1360 (Transmit Service Request and Location Information), in some embodiments, end device 120 may transmit, to service provider 110, the service request translated at block 1350 and location information regarding the location of end device 120, which is detected at block 1330. In some embodiments, at block 1360, end device 120 may transmit, to service provider 110, motion information regarding the motion sensed at block 1320 in addition to the service request and the location information. In some embodiments, at block 1360, end device 120 may transmit, to service provider 110, time information regarding a time at which end device 120 sensed the motion at block 1320 in addition to the service request and the location information. Processing may proceed from block 1360 to block 1370.

At block 1370 (Receive Service), in some embodiments, end device 120 may receive an expression of a service that is associated the location information of end device 120 from service provider 110. In some embodiments, end device 120 may receive an expression of a service that is associated the location information of end device 120 and the motion information of end device 120 from service provider 110. In some embodiments, end device 120 may receive an expression of a service that is associated the location information of end device 120 and the time information regarding the time at which end device 120 sensed the motion from service provider 110.

Further, at block 1370, end device 120 may display the expression of the service, which is received at block 1370.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Thus, FIG. 13 shows an example processing flow for implementing at least portions of motion based service provision by end device 120.

Figure 14:
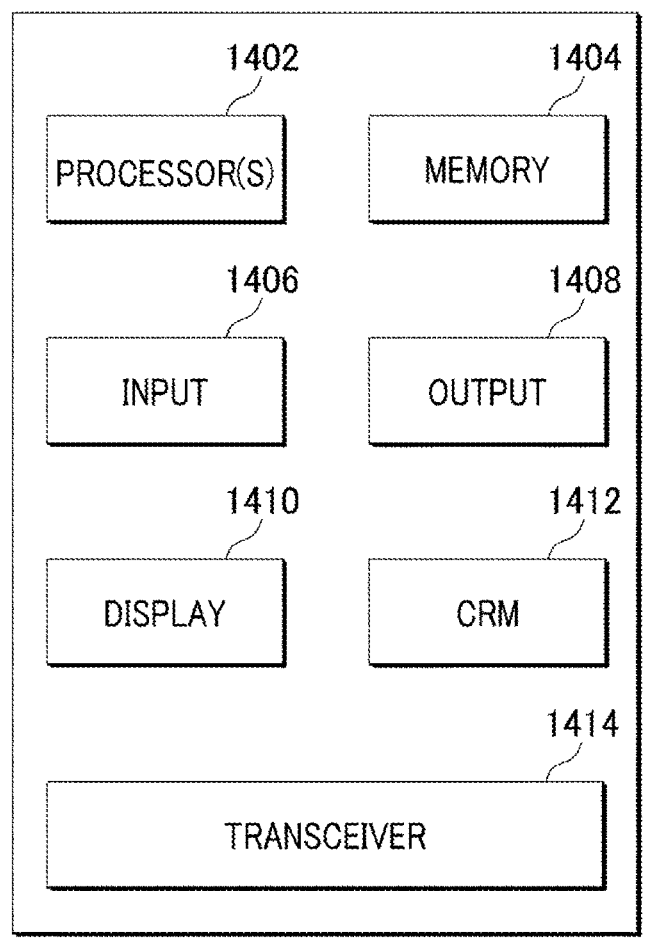
FIG. 14 shows an illustrative computing embodiment, in which any of the processes and sub-processes of motion based service provision may be implemented as computer-readable instructions stored on a computer-readable medium.

FIG. 14 shows an illustrative computing embodiment, in which any of the processes and sub-processes of motion based service provision may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1400 may typically include, at least, one or more processors 1402, a system memory 1406, one or more input components 1406, one or more output components 1408, a display component 1410, a computer-readable medium 1412, and a transceiver 1414.

Processor 1402 may refer to, e.g., a microprocessor, a microcontroller, a digital signal processor, or any combination thereof.

Memory 1404 may refer to, e.g., a volatile memory, non-volatile memory, or any combination thereof. Memory 1404 may store, therein, an operating system, an application, and/or program data. That is, memory 1404 may store executable instructions to implement any of the functions or operations described above and, therefore, memory 1404 may be regarded as a computer-readable medium.

Input component 1406 may refer to a built-in or communicatively coupled keyboard, touch screen, or telecommunication device. Alternatively, input component 1406 may include a microphone that is configured, in cooperation with a voice-recognition program that may be stored in memory 1404, to receive voice commands from a user of computing device 1400. Further, input component 1406, if not built-in to computing device 1400, may be communicatively coupled thereto via short-range communication protocols including, but not limited to, radio frequency or Bluetooth.

Output component 1408 may refer to a component or module, built-in or removable from computing device 1400, that is configured to output commands and data to an external device.

Display component 1410 may refer to, e.g., a solid state display that may have touch input capabilities. That is, display component 1410 may include capabilities that may be shared with or replace those of input component 1406.

Computer-readable medium 1412 may refer to a separable machine readable medium that is configured to store one or more programs that embody any of the functions or operations described above. That is, computer-readable medium 1412, which may be received into or otherwise connected to a drive component of computing device 1400, may store executable instructions to implement any of the functions or operations described above. These instructions may be complimentary or otherwise independent of those stored by memory 1404.

Transceiver 1414 may refer to a network communication link for computing device 1400, configured as a wired network or direct-wired connection. Alternatively, transceiver 1414 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. An end device, comprising:
  a sensor configured to sense a motion of the end device;
  a location detector configured to detect a location of the end device;
  a translator configured to translate parameters of the sensed motion into a service request stored in a memory of the end device;
  a transmitter configured to transmit, to a service provider, the service request and the location of the end device;
  a receiver configured to receive, from the service provider, an expression of a service that is associated with an object located within a predetermined range of the end device; and
  a motion correlation determination unit configured to determine whether a correlation between the sensed motion and a motion displayed on a display is quantifiable to be at least a predetermined value,
  wherein the transmitter transmits motion information regarding the sensed motion to the service provider when the correlation between the sensed motion and the motion displayed on the display is quantifiable to be at least the predetermined value.

2. The end device of claim 1,
  wherein the received expression of the service is associated further with the sensed motion.

3. The end device of claim 2, wherein the receiver is further configured to receive, from the service provider, the motion information depicting a motion that is to be enacted by a user relative to the end device, and
  wherein the end device further comprises the display configured to display the motion information.

4. The end device of claim 1, wherein the translator is configured to translate the parameters of the sensed motion into the service request when the sensor senses the motion under at least one of plural predefined conditions.

5. The end device of claim 4, wherein the at least one of plural predefined conditions includes one or more predetermined applications being activated on the end device.

6. The end device of claim 4, wherein the at least one of plural predefined conditions includes one or more predetermined web pages being open on a web browser of the end device.

7. An end device, comprising:
  a sensor configured to sense a motion of the end device;
  a location detector configured to detect a location of the end device;
  a translator configured to translate parameters of the sensed motion into a service request stored in a memory of the end device;
  a transmitter configured to transmit, to a service provider, the service request and the location of the end device; and
  a receiver configured to receive, from the service provider, an expression of a service that is associated with an object located within a predetermined range of the end device,
  wherein the transmitter is further configured to transmit, to the service providing server, additional information including at least one of a time at which the sensor sensed the motion of the end device, weather information in the vicinity of the end device, noise information in the vicinity of the end device, information regarding a user of the end device, and information regarding the end device, and wherein the received expression of the service is associated further with the additional information.

8. The end device of claim 7, wherein the information regarding the user of the end device includes at least one of an age of the user, a gender of the user, a cellular telephone number (CTN) of the user, and wherein the information regarding the end device includes at least one of a unique identifier of the end device, a media access control (MAC) address of the end device and an internet protocol (IP) address of the end device.

9. An end device, comprising:

a sensor configured to sense a motion of the end device;

a location detector configured to detect a location of the end device;

a translator configured to translate parameters of the sensed motion into a service request stored in a memory of the end device;

a transmitter configured to transmit, to a service provider, the service request and the location of the end device;

a receiver configured to receive, from the service provider, an expression of a service that is associated with an object located within a predetermined range of the end device; and a motion correlation determination unit configured to determine whether a correlation between a previously sensed motion and a reference motion stored in the memory of the end device is quantifiable to be at least a predetermined value, wherein the translator translates the parameters of the sensed motion into the service request when the correlation between the previous motion and the reference motion is quantifiable to be at least the predetermined value.

10. An end device, comprising:

a sensor configured to sense a motion of the end device;

a location detector configured to detect a location of the end device;

a translator configured to translate parameters of the sensed motion into a service request stored in a memory of the end device;

a transmitter configured to transmit, to a service provider, the service request and the location of the end device;

a receiver configured to receive, from the service provider, an expression of a service that is associated with an object located within a predetermined range of the end device;

the memory configured to store at least one motion information depicting at least one motion that is to be enacted by a user relative to the end device; and a motion correlation determination unit configured to determine whether a correlation between the sensed motion and the at least one motion is quantifiable to be at least a predetermined value, wherein the translator translates the parameters of the sensed motion into the service request when the correlation between the sensed motion and the at least one motion is quantifiable to be at least the predetermined value.

11. The end device of claim 10, wherein the receiver is further configured to receive the at least one motion information from the service provider.

12. A system, comprising:

an end device configured to:

sense a motion of the end device, translate parameters of the sensed motion into a service request, transmit, to a service provider, the service request and a location information of the end device, and determine whether a correlation between the sensed motion and a motion displayed on a display is quantifiable to be at least a predetermined value; and the service provider configured to:

receive, from the end device, the service request and the location information of the end device, and provide the end device with an expression of a service that is associated with an object located within a predetermined range of the end device, wherein the end device is further configured to transmit motion information regarding the sensed motion to the service provider when the correlation between the sensed motion and the motion displayed on the display is quantifiable to be at least the predetermined value.

13. The system of claim 12, wherein the service provider is configured to provide the end device with the expression of the service that is associated further with the sensed motion.

* * * * *